(12) United States Patent
Nguyen et al.

(10) Patent No.: US 11,139,594 B2
(45) Date of Patent: Oct. 5, 2021

(54) CONNECTORS FOR ELECTRO-OPTIC DISPLAYS

(71) Applicant: E INK CORPORATION, Billerica, MA (US)

(72) Inventors: Crystal Nguyen, Bedford, MA (US); George G. Harris, Woburn, MA (US); David Victor Marcolin, Coquitlam (CA); Seth J. Bishop, Framingham, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 16/851,340

(22) Filed: Apr. 17, 2020

(65) Prior Publication Data
US 2020/0350704 A1  Nov. 5, 2020

Related U.S. Application Data

(60) Provisional application No. 62/840,453, filed on Apr. 30, 2019.

(51) Int. Cl.
*H01R 4/2491*  (2018.01)
*G06F 1/18*  (2006.01)

(52) U.S. Cl.
CPC ........... *H01R 4/2491* (2013.01); *G06F 1/189* (2013.01); *H01R 2201/18* (2013.01)

(58) Field of Classification Search
CPC .. G02F 1/13452; H05K 1/142; H01M 50/124; H01L 23/49894
See application file for complete search history.

(56) References Cited

U.S. PATENT DOCUMENTS

| | | |
|---|---|---|
| 5,760,761 A | 6/1998 | Sheridon |
| 5,777,782 A | 7/1998 | Sheridon |
| 5,806,181 A | 9/1998 | Khandros et al. |
| 5,808,783 A | 9/1998 | Crowley |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,137,467 A | 10/2000 | Sheridon et al. |

(Continued)

FOREIGN PATENT DOCUMENTS

CN  201699203 U  1/2011

OTHER PUBLICATIONS

Wood, D., "An Electrochromic Renaissance?" Information Display, 18(3), 24 (Mar. 2002).

(Continued)

*Primary Examiner* — Jean F Duverne
(74) *Attorney, Agent, or Firm* — Jason P. Colangelo

(57) ABSTRACT

A connector for an electro-optic display comprising: a non-conductive sheet having a top surface and a bottom surface; a first layer of conductive material applied to at least a portion of the bottom surface; a second layer of conductive material applied to a first portion of the top surface; a third layer of conductive material applied to a second portion of the top surface, the third layer of conductive material being electrically isolated from the second layer of conductive material; and a conductive via electrically connecting the first layer of conductive material and the second layer of conductive material.

5 Claims, 15 Drawing Sheets

(56) References Cited

U.S. PATENT DOCUMENTS

| | | | |
|---|---|---|---|
| 6,147,791 | A | 11/2000 | Sheridon |
| 6,241,921 | B1 | 6/2001 | Jacobson et al. |
| 6,301,038 | B1 | 10/2001 | Fitzmaurice et al. |
| 6,866,760 | B2 | 3/2005 | Paolini, Jr. et al. |
| 6,870,657 | B1 | 3/2005 | Fitzmaurice et al. |
| 6,922,276 | B2 | 7/2005 | Zhang et al. |
| 6,950,220 | B2 | 9/2005 | Abramson et al. |
| 6,982,178 | B2 | 1/2006 | LeCain et al. |
| 7,002,728 | B2 | 2/2006 | Pullen et al. |
| 7,012,600 | B2 | 3/2006 | Zehner et al. |
| 7,072,095 | B2 | 7/2006 | Liang et al. |
| 7,075,502 | B1 | 7/2006 | Drzaic et al. |
| 7,116,318 | B2 | 10/2006 | Amundson et al. |
| 7,144,942 | B2 | 12/2006 | Zang et al. |
| 7,312,784 | B2 | 12/2007 | Baucom et al. |
| 7,339,715 | B2 | 3/2008 | Webber et al. |
| 7,411,719 | B2 | 8/2008 | Paolini, Jr. et al. |
| 7,420,549 | B2 | 9/2008 | Jacobson et al. |
| 7,453,445 | B2 | 11/2008 | Amundson |
| 7,535,624 | B2 | 5/2009 | Amundson et al. |
| 7,679,814 | B2 | 3/2010 | Paolini, Jr. et al. |
| 7,715,088 | B2 | 5/2010 | Liang et al. |
| 7,839,564 | B2 | 11/2010 | Whitesides et al. |
| 8,009,348 | B2 | 8/2011 | Zehner et al. |
| 9,279,906 | B2 | 3/2016 | Kang |
| 10,361,151 | B2 * | 7/2019 | Lin .................. H01L 23/49894 |
| 10,444,553 | B2 | 10/2019 | Laxton |
| 10,498,092 | B2 | 12/2019 | Tseng et al. |
| 10,884,300 | B2 * | 1/2021 | Kim .................... G02F 1/13452 |
| 2015/0005720 | A1 | 1/2015 | Zang |
| 2015/0029436 | A1 * | 1/2015 | Nakayama ............. H05K 1/142 |
| | | | 349/58 |
| 2015/0171406 | A1 * | 6/2015 | Bazzarella .......... H01M 50/124 |
| | | | 429/120 |
| 2016/0012710 | A1 | 1/2016 | Lu et al. |
| 2016/0377951 | A1 | 12/2016 | Harris |
| 2017/0238437 | A1 * | 8/2017 | Ishida ................... H05K 1/142 |
| | | | 361/800 |
| 2019/0067844 | A1 | 2/2019 | Go et al. |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Korean Intellectual Property Office, PCT/US2020/028682, International Search Report and Written Opinion, dated Jul. 31, 2020.

* cited by examiner

CONNECTORS FOR ELECTRO-OPTIC DISPLAYS

REFERENCE TO RELATED APPLICATIONS

This application claims priority to U.S. Patent Application No. 62/840,453 filed on Apr. 30, 2019. The entire content of the above mentioned application is herein incorporated by reference.

FIELD OF THE INVENTION

This invention relates to electrical connectors. More specifically, in one aspect this invention relates to electrical connectors for laminated electro-optic displays and methods of incorporating the connectors in a laminated electro-optic display to provide an electrical connection to the top and bottom electrodes within the display stack.

BACKGROUND

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or, in the case of displays intended for machine reading, pseudo-color in the sense of a change in reflectance of electromagnetic wavelengths outside the visible range.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737, and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, one electrode layer has the form of a single continuous electrode and the other electrode layer may comprise an array of electrodes or one or more conductive segments, each of which defines one pixel of the display.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing one or more pixel electrodes and an appropriate arrangement of conductors to connect the pixel electrodes to drive circuitry, is prepared. To form the final display, the substrate having the capsule/binder layer thereon is laminated to the backplane using a lamination adhesive. In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

Current procedures for making electrical connections for a segmented display, wherein each pixel electrode is a conductive segment, requires all electrical contacts to be set prior to laminating the top sheet having the electro-optic medium onto the underlying substrate. This generally limits the location of the contacts to the edge of the display or requires specialized tools to kiss cut the display after lamination to expose a contact point for making a connection. The method of making present electrical connections also does not enable in-field repairing if the electrical connection is broken on the display.

Thus, there is a need for improved production techniques associated with incorporating electrical connections in laminated electro-optic displays.

SUMMARY OF THE INVENTION

In a first aspect, the present application provides a connector for an electro-optic display comprising: a non-conductive sheet having a top surface and a bottom surface; a first layer of conductive material applied to at least a portion of the bottom surface; a second layer of conductive material applied to a first portion of the top surface; a third layer of conductive material applied to a second portion of the top surface, the third layer of conductive material being electrically isolated from the second layer of conductive material; and a conductive via electrically connecting the first layer of conductive material and the second layer of conductive material.

In a second aspect, the present application provides a connector for an electro-optic display comprising; a first non-conductive component; a first layer of conductive material applied to a portion of the first non-conductive component; a second non-conductive component; a second layer of conductive material applied to a portion of the second non-conductive component; wherein the first non-conductive component is configured to couple with the second non-conductive component, such that first layer of conductive material is electrically isolated from the second layer of conductive material.

In a third aspect, the present application provides a connector for an electro-optic display comprising; a first non-conductive component: a first layer of conductive material applied to a portion of the first non-conductive component; a second non-conductive component; a second layer of conductive material applied to a first portion of the second non-conductive component; a third layer of conductive material applied to a second portion of the second non-conductive component, wherein the third layer of conductive material is electrically isolated from the second layer of conductive material; wherein the first non-conductive component is configured to couple with the second non-conductive component, such that first layer of conductive material is electrically connected to the second layer of conductive material.

These and other aspects of the present invention will be apparent in view of the following description.

BRIEF DESCRIPTION OF THE FIGURES

The drawing Figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

The various examples described in this section relate to electrical connectors for laminated displays and methods allowing for electrical connections at any location on the display after lamination. According to various embodiments of the present invention, a laminated electro-optic display may be scored to create an opening that is cleaned to expose a portion of each electrode on either side of the layer of electro-optic medium. A connecter may then be inserted into the opening in order to make an electrical connection with both the top and bottom electrode within the laminated display.

Reference now is made in detail to the examples illustrated in the accompanying drawings and discussed below.

Figure 1A:
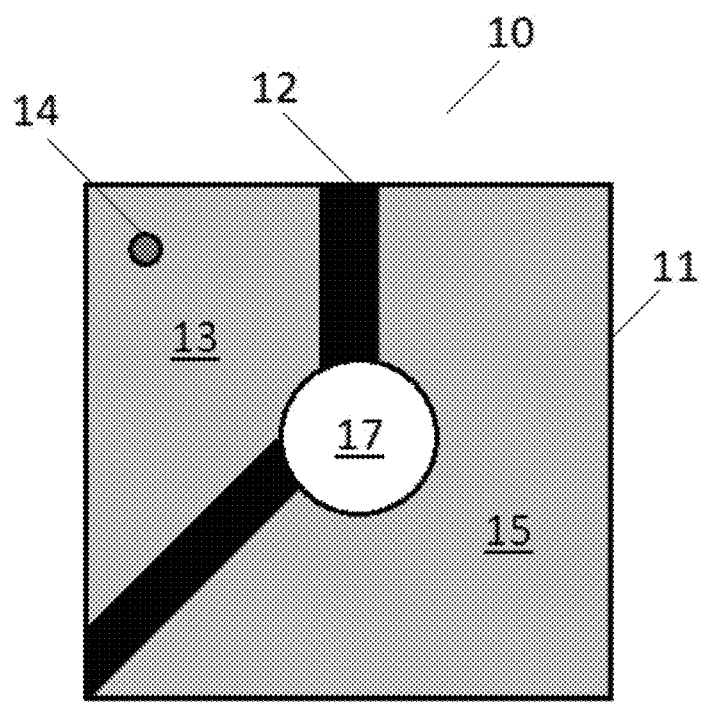
FIG. 1A is a top plan view of a connector according to a first embodiment of the present invention.
Figure 1B:
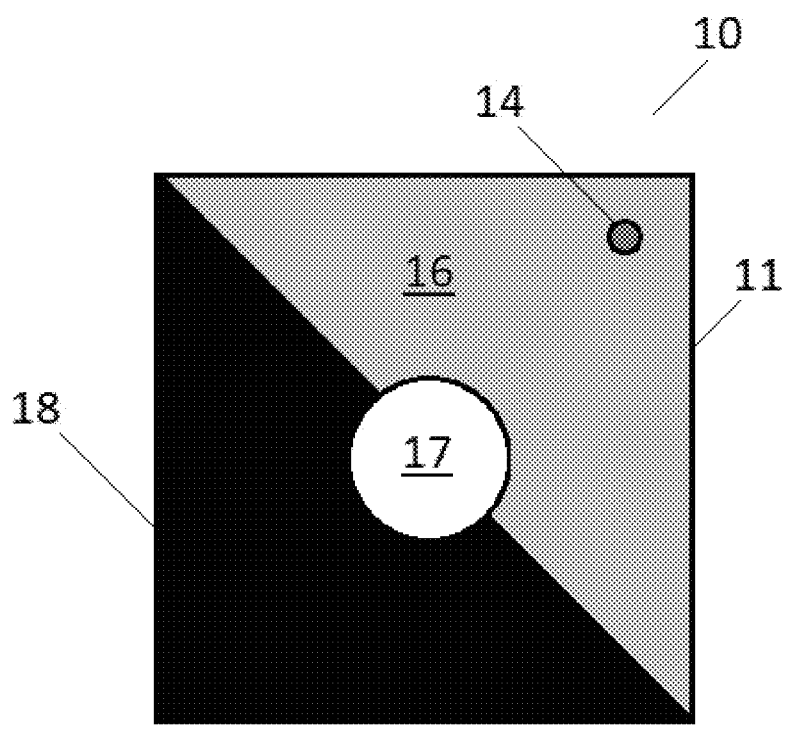
FIG. 1B is a bottom plan view of the connector of FIG. 1A.

A connector 10 according to a first embodiment of the present invention is illustrated in FIGS. 1A and 1B. The connector 10 may include a non-conductive sheet 11 having a top surface and a bottom surface. At least a portion of the bottom surface may be coated with a first conductive layer 16. The remaining portion 18 of the bottom surface, if left uncoated, is preferably non-conductive. In order to provide a connector 10 having a uniform thickness, the remaining portion 18 of the bottom surface may optionally be coated with a layer of a non-conductive material (e.g. a dielectric material). A second conductive layer 13 and third conductive layer 15 may be coated on a first portion and section portion of the top surface of the connector 10, respectively, such that the second conductive layer 13 and third conductive layer 15 are electrically isolated from each other by a non-conductive area 12. The non-conductive area 12 may in some embodiments be a gap of sufficient distance to prevent an electrical short. Alternatively, a layer of non-conductive material may be applied over the area 12, such as a dielectric material. A conductive via 14 that extends through the thickness of the non-conductive sheet 11 electrically connects the first conductive layer 16 on the bottom surface of the connector 10 to the second conductive layer 13 on the top surface of the connector 10. The conductive material of each conductive layer of the connector, as well as the via, may be the same or different and may include, but is not limited to, a metal, metal oxide, conductive polymer, composite material, nanomaterials, and combinations thereof. The connector 10 may also include an optional hole 17 to accommodate a fastener, which will be described in greater detail below.

The connector 10 may be inserted into an electro-optic display, such as the laminated display 20 illustrated in FIGS. 3A to 3I. The laminate 20 may comprise a top light-transmissive protective sheet 24 having a layer of conductive material applied to the interior side of the top sheet 24 to form a first electrode 27. The first electrode 27 is also light-transmissive. The laminate 20 further comprises a substrate 25 that may or may not be light-transmissive forming a bottom sheet that also includes a coating of conductive material on its interior side to provide a second electrode 26. A layer of electro-optic material 28 is located between the top electrode 27 and bottom electrode 26, and preferably comprises an encapsulated electro-optic medium, more preferably a plurality of capsules in a binder, wherein each capsule contains a dispersion of charged particles in a fluid.

Figure 2:
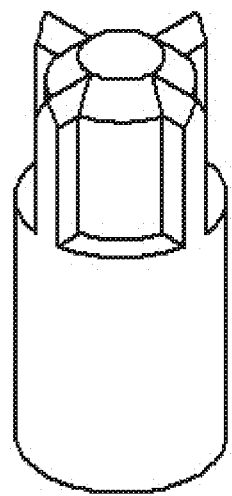
FIG. 2 is a top perspective view of a die punch.
Figure 3A:
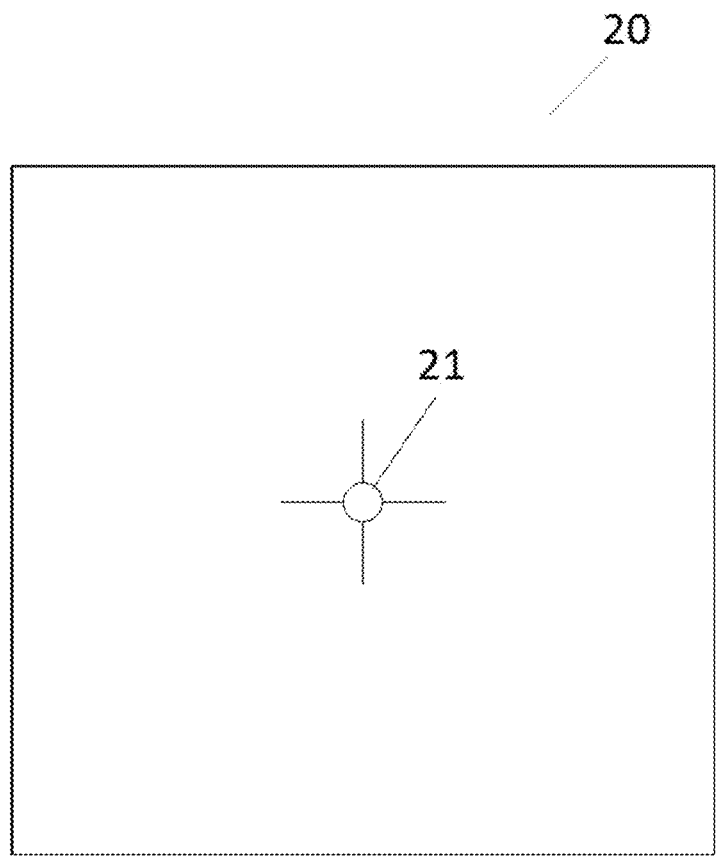
FIG. 3A is a top plan view of a laminated electro-optic display having an incision made with the die punch of FIG. 2.
Figure 3B:
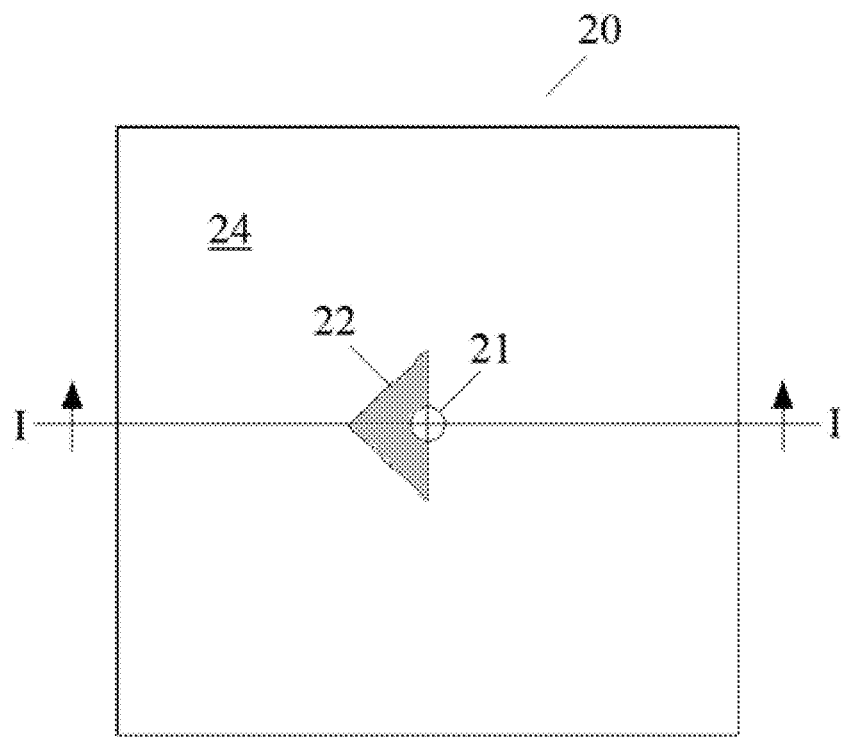
FIG. 3B is top plan view of the laminated electro-optic display of FIG. 3A, wherein a portion of the bottom electrode is exposed.
Figure 3C:
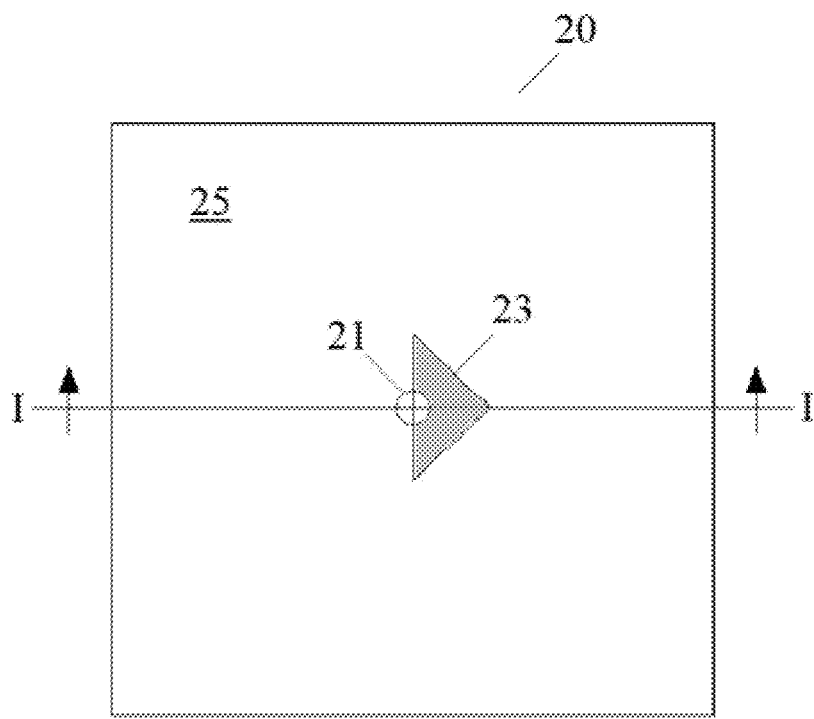
FIG. 3C is bottom plan view of the laminated electro-optic display of FIG. 3A, wherein a portion of the top electrode is exposed.
Figure 3D:
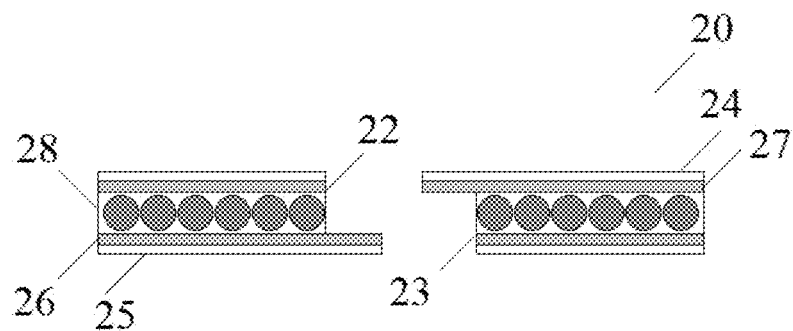
FIG. 3D is a cross-sectional side view of the laminated electro-optic display of FIGS. 3B and 3C along axis I-I.

According to one preferred method of incorporating the connector 10 into a display, the laminate 20 may be cut using a die punch, such as the die punch illustrated in FIG. 2 having a cross-hair shaped blade. The die punch may be used to punch an incision 21 through the thickness of the laminate 20 at any desired location to provide a cross-hair shaped incision 21 as illustrated in FIG. 3A. The incision essentially provides four triangle-shaped flaps on the top sheet 24 and bottom substrate 25 of the laminate 20. After the incision 21 is made, two adjacent flaps in the top sheet 24 of the laminate 20 are removed to provide a triangle-shaped opening 22, and two adjacent flaps of the bottom sheet 25 of the laminate 20 are removed to provide another triangle shaped opening 23 in the bottom sheet 25.

Figure 3E:
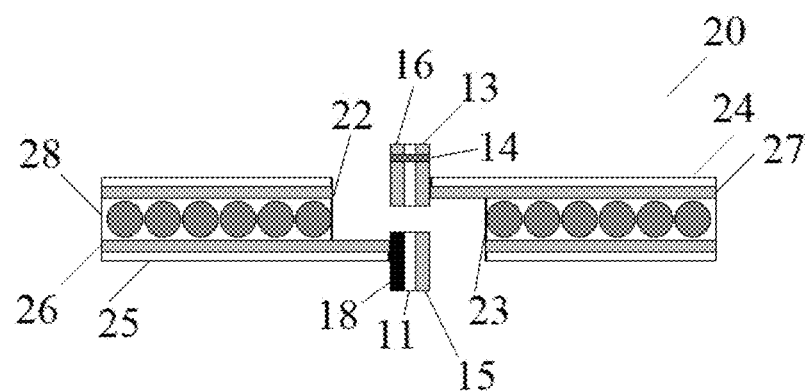
FIGS. 3E and 3F are cross-sectional side views of the laminated electro-display having the connector of FIGS. 1A and 1B inserted in an opening of the display.
Figure 3F:
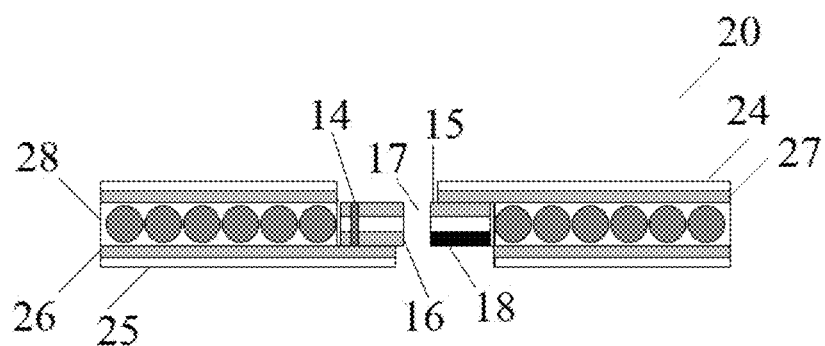
Figure 3G:
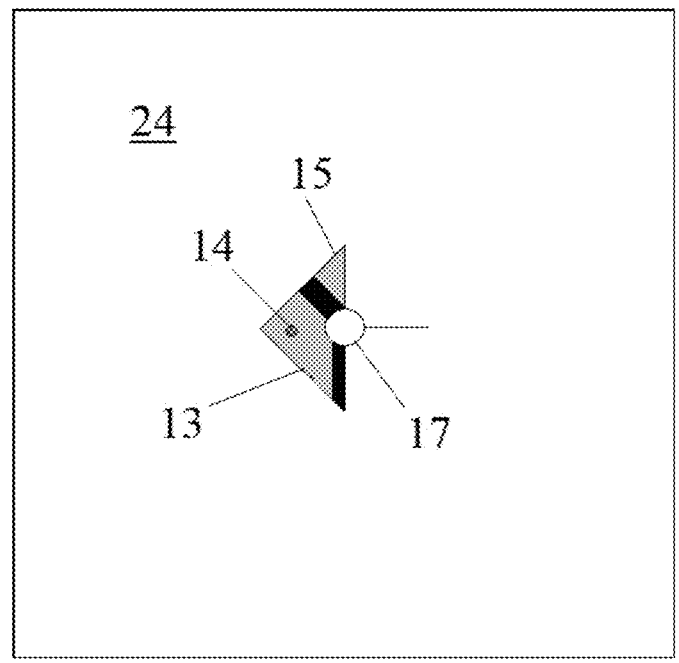
FIG. 3G is a top plan view of the laminated electro-optic display of FIG. 3F.
Figure 3H:
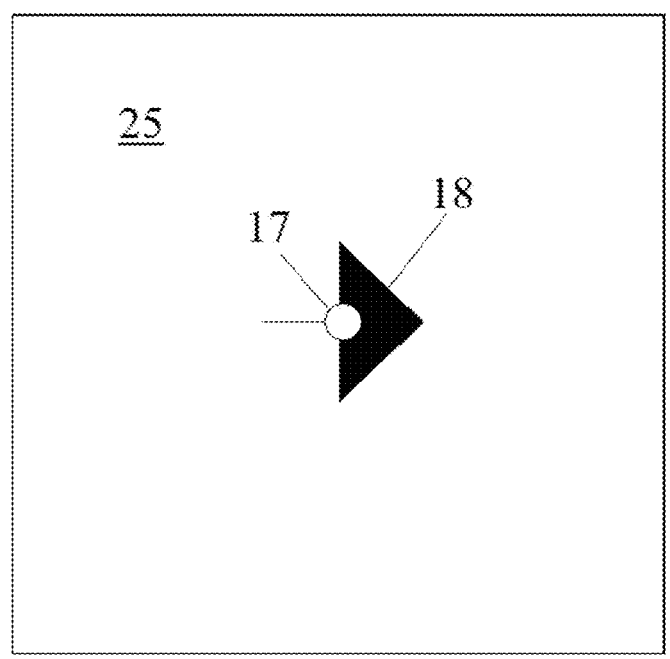
FIG. 3H is a bottom plan view of the laminated electro-optic display of FIG. 3F.
Figure 3I:
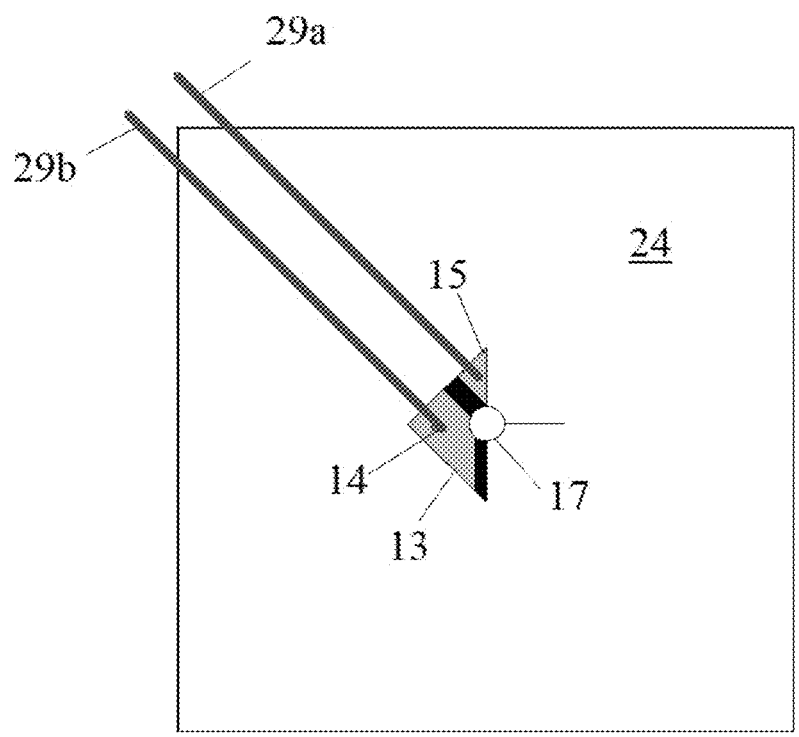
FIG. 3I is a top plan view of FIG. 3G, wherein two leads are connected to the electrical connector according to a first embodiment of the present invention.

After the triangular shaped openings 22, 23 are provided, any electro-optic media 28 or other materials within the laminate 20, such as adhesives, may be cleaned away to expose the top electrode 27 and bottom electrode 26. A corner of the connector 10 may be inserted into opening 22 and pushed until the hole 17 of the connector 20 in in the middle of the laminate 20, as illustrated in FIG. 3E. Upon reaching the middle of the laminate 20, the connector 10 is rotated until the first conductive material 16 of the connector 10 contacts the bottom electrode 26 and third conductive material 15 contacts the front electrode 27. In a subsequent step, two leads may be soldered to the connector 10. For example, a first lead or wire 29a may be soldered to the third conductive material 15 to provide an electrical connection to the top electrode 27 of the display 20, and a second lead or wire 29b may be soldered to the conductive via 14 and/or the first second conductive material 13 to provide an electrical connection to the bottom electrode 26. Other methods of providing contact points or leads may also be used, such as providing the connector in the form of a flexible printed circuit with electrodes/contact leads incorporated into the design. The leads may then be attached to a power source and at least one of a switch and a controller for applying an electric field to the electro-optic medium to cause a change in an optical state of the display.

Figure 4A:
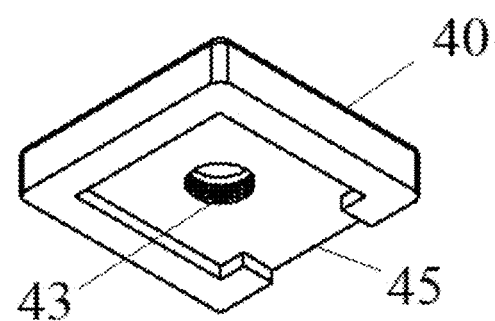
FIG. 4A is a bottom perspective view of atop component of a fastener that may be used with the connector made according to the first embodiment of the present invention.
Figure 4B:
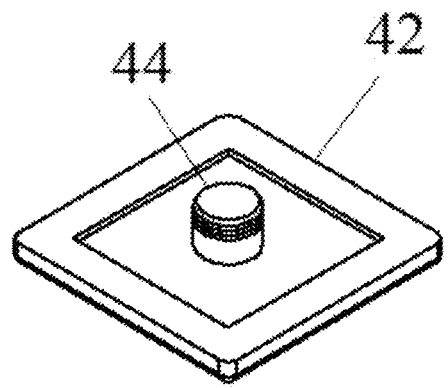
FIG. 4B is a top perspective view of a bottom component of a fastener that may be used with the connector made according to the first embodiment of the present invention.

Any method of fastening the connector 10 to the laminate 20 to maintain an electrical connection with the top electrode 27 and bottom electrode 26 may be employed. For example, an adhesive tape may be applied over the connector 20 and onto the top and bottom surface of the laminate 20. Alternatively, a fastener, such as the fastener illustrated in FIGS. 4A and 4B may be used. The fastener comprises a top component 40 and a bottom component 42.

Figure 5A:
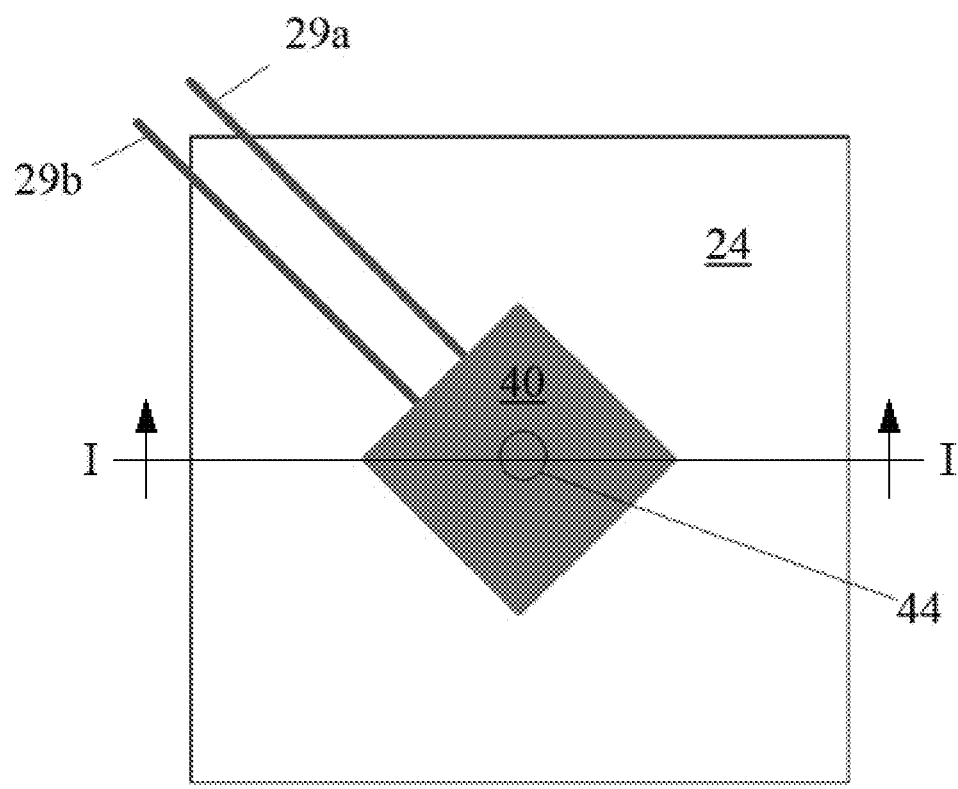
FIG. 5A is a top plan view of FIG. 3 having the fastener of FIGS. 4A and 4B attached.
Figure 5B:
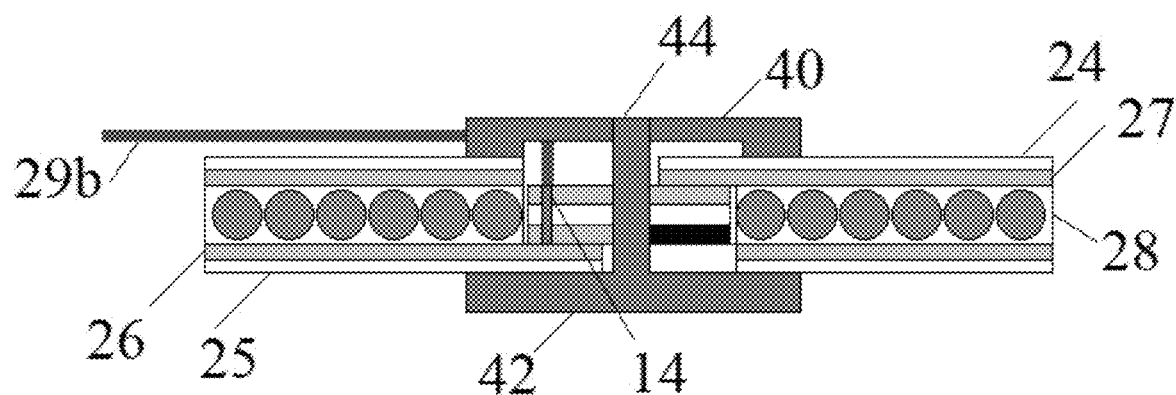
FIG. 5B is a cross-sectional side view of FIG. 5A along axis I-I.

The bottom component 42 includes a peg 44 that may be inserted through the hole 17 of the connector 10 and pressed against the bottom sheet 25 of the laminate 20. The top component 40 may be applied over the connector 10 on the top side of the laminate 20, such that the peg 44 is inserted through a corresponding hole 43 in the top component 40. Alternatively, the top component 40 may include a similarly shaped receptacle to mate with the peg 44 that is not open on both ends. In order to secure the top component 40 and the bottom component 42 together, the distal end of the peg 44 and/or the inner surface of the hole 43 may optionally include one or more features to provide a friction fit or a snap fit between the two components. The top component 40 may also be configured to accommodate the leads 29a, 29b and include a window 45 on at least one side of the top component 40, so that the leads 29a, 29b are not disturbed upon fastening the top component 40 and bottom component 42 together, as illustrated in FIGS. 5A and 5B.

Figure 5C:
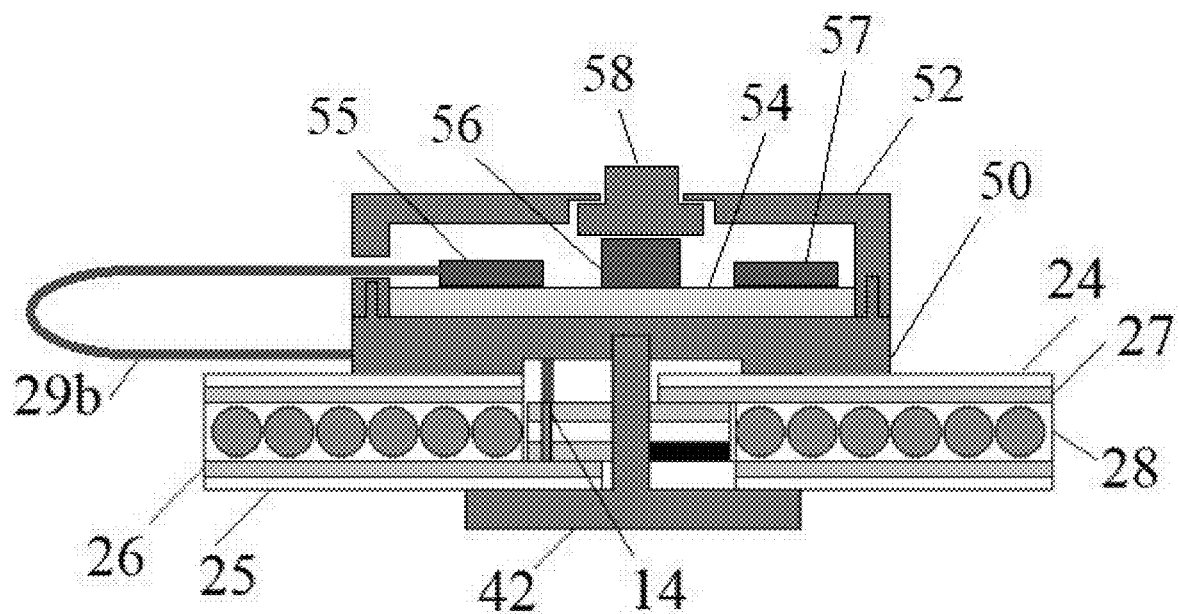
FIG. 5C is a cross-sectional side view of a second fastener for the connector according to the first embodiment of the present invention.

In another embodiment of the invention, the fastener may be provided with a housing to accommodate the controller and/or power source for the display. For example, referring to FIG. 5C, the top component 50 may again include a female receptacle for receiving the peg in the bottom component 42; however, the top component 50 may also include a cover 52 configured to form a housing when connected to the top component 50. The housing may accommodate one or more components needed to operate the display. For example, the cover 52 may include an opening through which the leads 29a, 29b may be inserted to connect the leads 29a, 29b to a controller 55, switch 56, and/or power source 57 (e.g. battery) that may be mounted onto a printed circuit board 54 within the housing. The cover 52 may further comprise an actuator 58, such as a button, for actuating the switch 56. The controller 55, switch 56, and power source 57 may then be used to control the voltage supplied to the top electrode 27 and bottom electrode 26 for applying an electric field to the electro-optic medium 28.

Figure 6A:
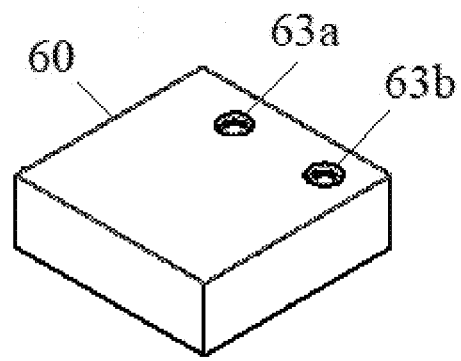
FIG. 6A is a top perspective view of a top component for a third fastener for the connector according to the first embodiment of the present invention.
Figure 6B:
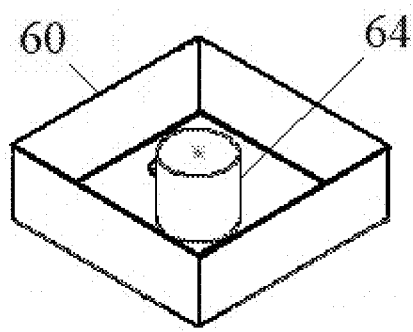
FIG. 6B is a bottom perspective view of the top component of FIG. 6A
Figure 6C:
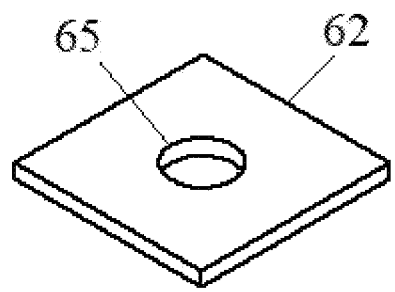
FIG. 6C is a top perspective view of a bottom component that couples to the top component of FIG. 6A.

Various aspects of the fastener may be modified. For example referring to FIGS. 6A and 6B, the location of the peg 64 and corresponding hole 65 for coupling the top component 60 to the bottom component 62 may be reversed, such that the peg 64 extends from the top component 60, and the bottom component 62 is provided with the corresponding hole 65. The fastener may also be modified by eliminating the window in the side of the top component 60 and instead providing the top component 60 with two vias 63a, 63b through which the leads 29a, 29b may be inserted.

Figure 7A:
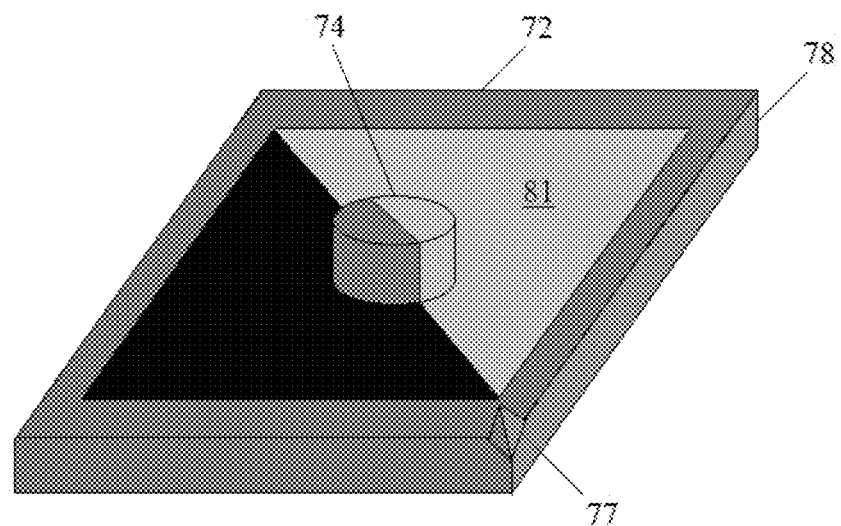
FIG. 7A is a top perspective view of a bottom component for a connector according to a second embodiment of the present invention.
Figure 7B:
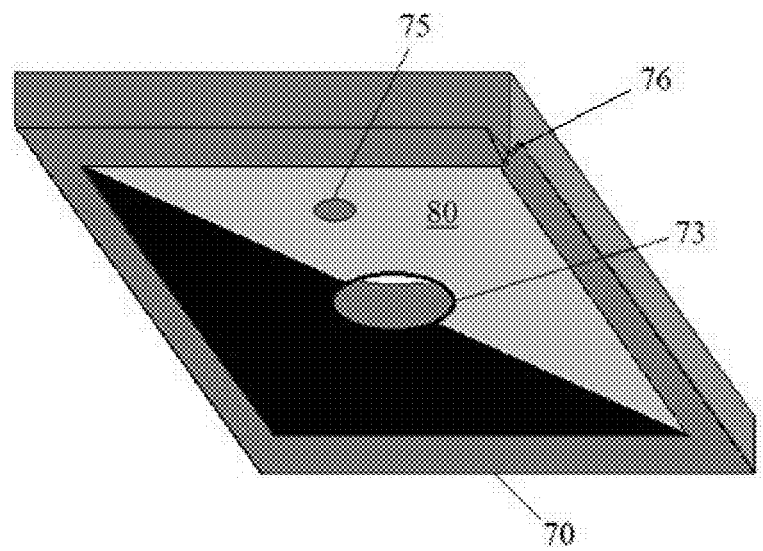
FIG. 7B is a bottom perspective view of a top component for a connector according to the second embodiment of the present invention.
Figure 7C:
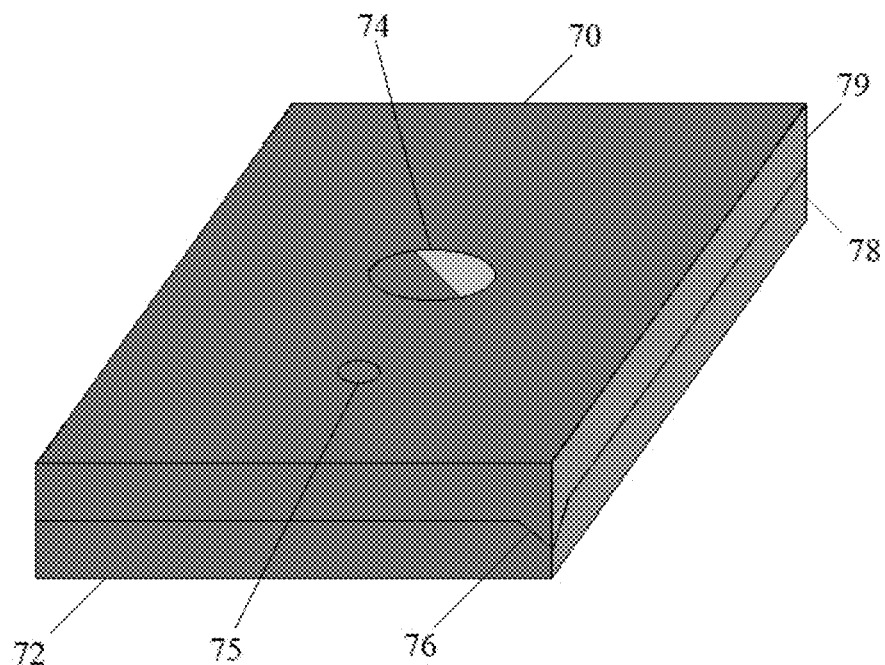
FIG. 7C is top perspective view of the connector according to the second embodiment of the present invention.

In yet another embodiment of the present invention, the conductive layering applied to the various portions of the connector may instead be applied to the inner surfaces of the fastener. For example, referring to FIGS. 7A, 7B, and 7C, the fastener may include a top component 70 and bottom component 72 that is similar to the previously described fasteners in that the bottom component 72 may include a peg 74 that extends and is inserted into a corresponding hole 73 of the top component 70. However, the bottom component 72 may also include a first conductive layer 81 that is applied to at least a portion of the peg 74 and the same surface from which the peg 74 projects. A second conductive layer 80 may be applied to at least a portion of the underside of the top component 70. When fastened to a laminated display that has been cut and cleaned to expose the electrode layers, such as the laminated display 20 of FIGS. 3A to 3D, the fastener may be placed in either of two configurations. In the first configuration, the wires or leads are positioned on the viewing side. In the second configuration, the wires or leads are placed on the non-viewing side. When the wires or leads are to be positioned on the non-viewing side, the second conductive layer 80 may electrically contact the top electrode, such as top electrode 27, and the first conductive layer 81 may electrically contact the bottom electrode, such as bottom electrode 26. A conductive via 75 through the top component 70 may a provide a solder point for a wire or lead, while the top, exposed surface of the peg 74 may provide a second solder point for another lead or wire.

In order to ensure that the top component and the bottom component are correctly oriented prior to connecting the two pieces, the fasteners included in the various embodiments of the present invention may be provided with one or more features to facilitate proper alignment. For example, referring again to FIGS. 7A, 7B, and 7C, one or more corners of one of the components may include a projection or tab 76 that mates with a correspondence recess 77 on the other component. Therefore, the incision in the laminated display may be of a shape allowing the projection or tab to pass through the laminate. To this end, the die punch may be fitted with a matching feature to remove a section of the laminate and create a passage for the projection or tab.

Alternatively, each of the top components may include some indicia on one of their respective sides, so that the indicia are aligned in the fastened condition. For example in FIG. 7C, side surfaces 78, 79 may have a similar color that differs from the color of the remaining outer surfaces of the fastener and in the fastened condition the side surfaces 78, 79 will be adjacent to each other. Other features may also be incorporated into the fastener, such as using one or more off-center pegs or forming the top component and bottom component into asymmetrical or irregular polygonal shapes that only align when in a fastened condition, for example.

Figure 8:
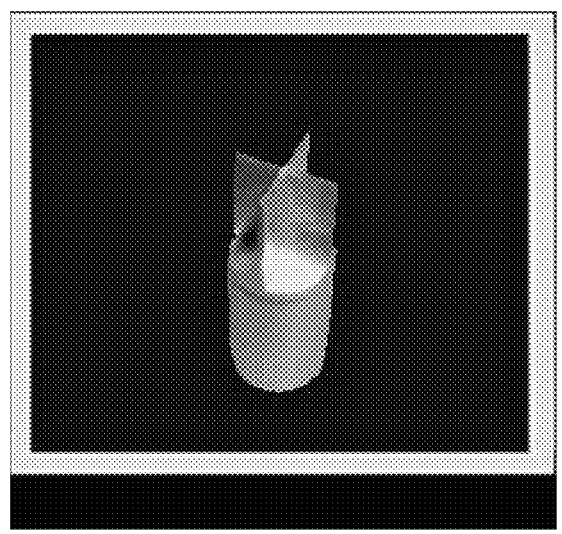
FIG. 8 is a top perspective view of another die punch.
Figure 9A:
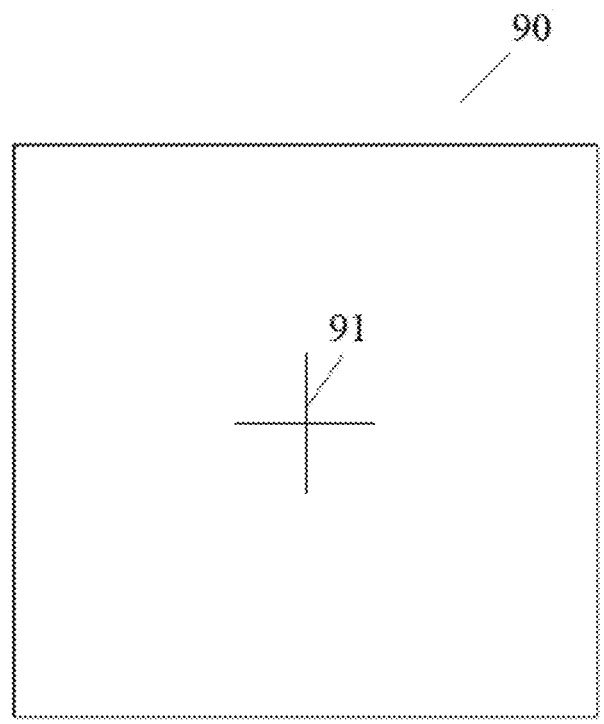
FIG. 9A is a top plan view of a laminated electro-optic display having an incision made with the die punch of FIG. 8.
Figure 9B:
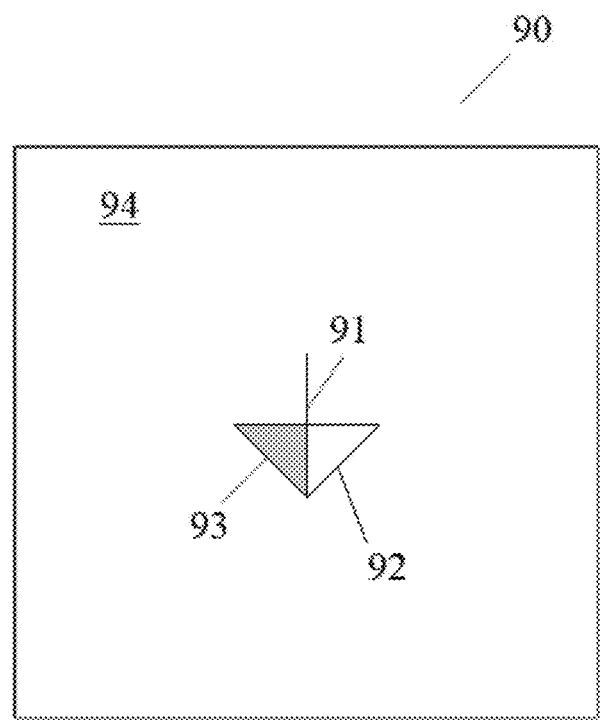
FIG. 9B is top plan view of the laminated electro-optic display of FIG. 9A, wherein a portion of the bottom electrode is exposed.
Figure 9C:
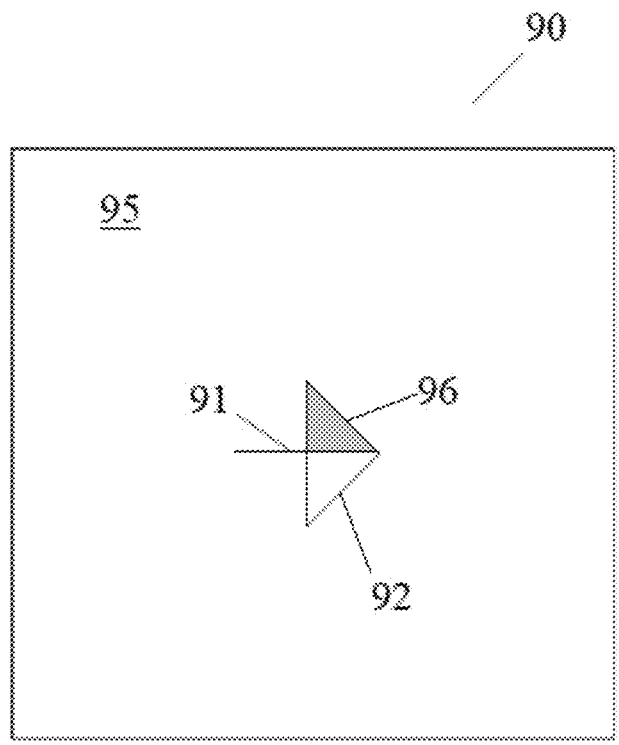
FIG. 9C is bottom plan view of the laminated electro-optic display of FIG. 9A, wherein a portion of the top electrode is exposed.
Figure 10A:
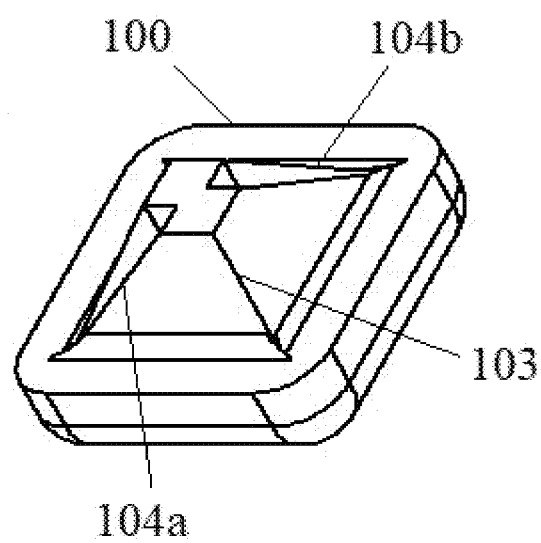
FIG. 10A is a bottom perspective view of a top component for a connector according to the third embodiment of the present invention.
Figure 10B:
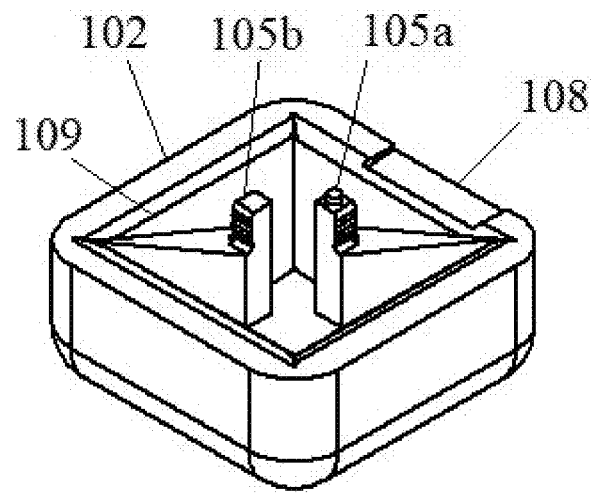
FIG. 10B is a top perspective view of a bottom component for a connector according to the third embodiment of the present invention.
Figure 10C:
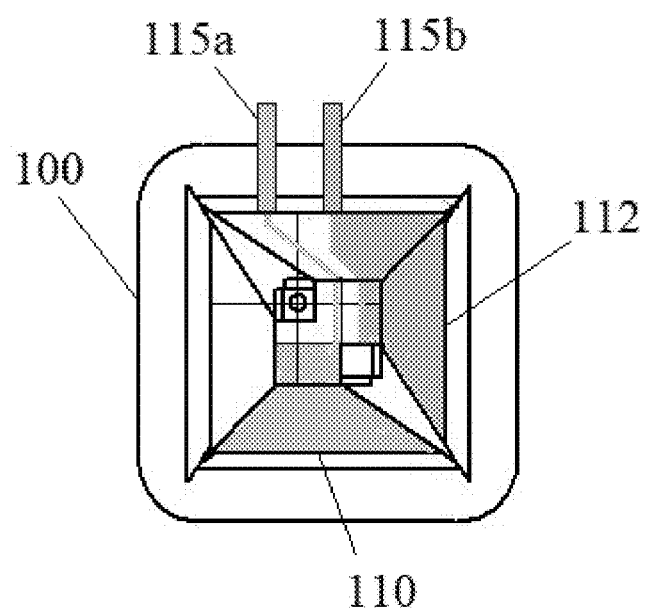
FIG. 10C is a bottom plan view of the top component of FIG. 10A having conductive material applied to a portion of the bottom surfaces of the component.
Figure 10D:
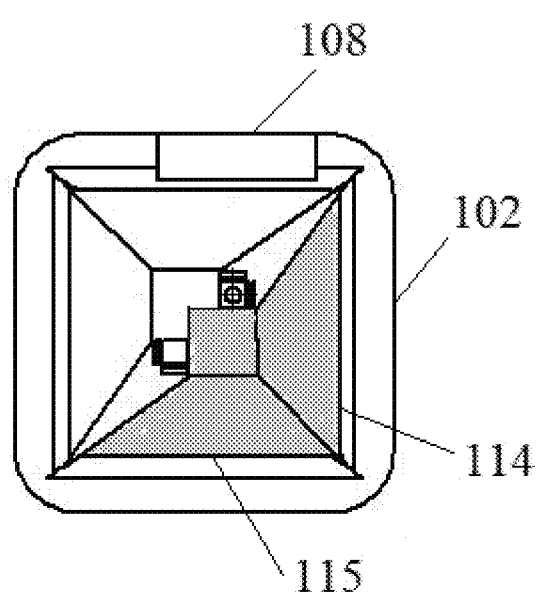
FIG. 10D is a top plan view of the bottom component of FIG. 10B having conductive material applied to a portion of the inner surfaces of the component.

According to yet another of the present invention, a fastener may be provided that includes the internal conductive material for making electrical connections to the top and bottom electrode of a laminated display, but excludes a peg. Therefore, the incision in the laminated display may exclude a central hole. The incision may be provided with a die punch with an X-shaped blade, such as the die punch illustrated in FIG. 8. The result will be an X-shaped incision through the thickness of the laminated display, such as the incision 91 in display 90 illustrated in FIG. 9A that will provide four flaps on either side of the laminate 90. In order to attach the fastener illustrated in FIGS. 10A-10D described in greater below, two adjacent flaps in the top sheet 94 are removed to provide a triangular opening 93 and two adjacent flaps in the bottom sheet 95 are removed to provide another triangular opening 96, such that the two openings overlap. The result will be a triangular hole 92 in the laminate. As previously described, any electro-optic medium and adhesive within the opening is cleaned away to expose the top and bottom electrode of the laminated display.

Referring now to FIGS. 10A to 10D, the fastener may include a top component 100 and a bottom component 102. The top component 100 includes a projection 103 having a plurality of angled faces and two gaps 104a, 104b. The bottom component 102 includes two pegs 105a, 105b and a well 109 also having a plurality of angled faces, so that the well 109 will couple with the projection 103 in a fastened condition. The inclined surfaces of the projection 103 when inserted through the incision 91 in the top sheet 94 will spread the remaining flaps apart to create a space through which the pegs 105a, 105b may be inserted. The pegs 105a, 105b and/or the gaps 104a, 104b may include surface features to provide a friction fit or snap fit, for example, between the top component 100 and bottom component 102 in the fastened condition.

In order to provide an electrical connection, certain faces of the top component 100 and bottom component 102 may be coated with conductive layers. For example, the top component 112 may have an angled surface 112 coated with a conductive layer that contacts the bottom electrode of the laminated display 90 through triangular opening 93 in the top sheet 94. The bottom component 102 may have two angled surfaces 114, 115 within the well 109 that is coated with a conductive layer. One of the angled surfaces 114 may contact the top electrode through the opening 96 in the bottom sheet 95 of the laminated display 90. When the top component 100 and the bottom component 102 are attached through the incision 91, the conductive layer on coated surface 115 of the bottom component 108 may contact a conductive layer applied to angled surface 110 on projection 103 through the hole 92 in the laminated display 90, thereby forming an electrical connection. A flexible conductive trace or tail 115a may then be connected to the conductive layer on face 110 to provide a soldering point for a lead, and a similar conductive trace or tail 115b may be connected to the conductive layer on angled face 112 of the top component 100. A window 108 may be provided in a side wall of the bottom component 102 through which the flexible tails 115a, 115b may extend.

The various embodiments of the present invention provide connectors and procedures for making electrical connections to the top and bottom electrodes of a laminated electro-optic display post-lamination. The connectors may be incorporated generally at any location on the surface of the display without the use of specialized tools, thereby allowing for in-field repair if the electrical connections are broken on the display. To this end, one embodiment of the present application provides field kits for repairing broken display electrical connections. A typical kit may include one of the connectors provided above, a die punch for punching incisions through display laminates, and a fastener for configurations where one is required. Optionally, instructions may be included for specifying, in order of implementation, the steps to be taken to repair a broken electrical connection, the instructions relating the parts of the kits to such steps. The instructions may be in printed form or downloadable from websites printed on the packaging or other parts of the kit.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention. In the event of any inconsistency between the content of this application and any of the patents and application incorporated by reference herein, the content of this application shall control to the extent necessary to resolve such inconsistency.

We claim:

1. A field kit for repairing electrical connections in an electro-optic display comprising a display laminate, the field kit comprising:
   (a) a connector comprising:
      a non-conductive sheet having a top surface and a bottom surface;
      a first layer of conductive material applied to at least a portion of the bottom surface;
      a second layer of conductive material applied to a first portion of the top surface;
      a third layer of conductive material applied to a second portion of the top surface, the third layer of conductive material being electrically isolated from the second layer of conductive material; and
      a conductive via electrically connecting the first layer of conductive material and the second layer of conductive material;
   (b) a fastener comprising a top component configured to couple with a bottom component, wherein the non-conductive sheet is between the top component and the bottom component in an installed condition; and (c) a die punch for punching an incision through the display laminate.

2. The field kit of claim 1, wherein the die punch comprises a cross-hair shaped blade.

3. The field kit of claim 1, wherein the connector further comprises a hole to accommodate the fastener.

4. A field kit for repairing electrical connections in an electro-optic display comprising a display laminate, the field kit comprising:
(a) a connector comprising:
a first non-conductive component;
a first layer of conductive material applied to a portion of the first non-conductive component;
a second non-conductive component; and
a second layer of conductive material applied to a portion of the second non-conductive component,
wherein the first non-conductive component is configured to couple with the second non-conductive component, such that first layer of conductive material is electrically isolated from the second layer of conductive material; and
(b) a die punch for punching an incision through the display laminate, wherein the die punch comprises a cross-hair shaped blade.

5. A field kit for repairing electrical connections in an electro-optic display comprising a display laminate, the field kit comprising:
(a) a connector comprising:
a first non-conductive component;
a first layer of conductive material applied to a portion of the first non-conductive component;
a second non-conductive component;
a second layer of conductive material applied to a first portion of the second non-conductive component; and
a third layer of conductive material applied to a second portion of the second non-conductive component,
wherein the third layer of conductive material is electrically isolated from the second layer of conductive material, and
wherein the first non-conductive component is configured to couple with the second non-conductive component, such that first layer of conductive material is electrically connected to the second layer of conductive material; and
(b) a die punch for punching an incision through the display laminate, wherein the die punch comprises a cross-hair shaped blade.

* * * * *